(12) United States Patent
Lange et al.

(10) Patent No.: US 9,273,986 B2
(45) Date of Patent: Mar. 1, 2016

(54) WATER FLOW MEASUREMENT DEVICE

(75) Inventors: Gary R. Lange, La Crosse, WI (US); William B. Fox, Onalaska, WI (US)

(73) Assignee: TRANE INTERNATIONAL INC., Davidson, NC (US)

( * ) Notice: Subject to any disclaimer, the term of this patent is extended or adjusted under 35 U.S.C. 154(b) by 320 days.

(21) Appl. No.: 13/086,441

(22) Filed: Apr. 14, 2011

(65) Prior Publication Data
US 2012/0260692 A1 Oct. 18, 2012

(51) Int. Cl.
*G01F 1/68* (2006.01)
*G01F 1/44* (2006.01)
*G01F 1/40* (2006.01)
*G01P 5/17* (2006.01)
*G01F 1/05* (2006.01)
*G01P 5/14* (2006.01)
*G01F 1/22* (2006.01)
(Continued)

(52) U.S. Cl.
CPC ... *G01F 1/68* (2013.01); *G01F 1/05* (2013.01); *G01F 1/22* (2013.01); *G01F 1/36* (2013.01); *G01F 1/40* (2013.01); *G01F 1/42* (2013.01); *G01F 1/44* (2013.01); *G01P 5/14* (2013.01); *G01P 5/16* (2013.01); *G01P 5/17* (2013.01)

(58) Field of Classification Search
CPC .............. G01F 1/68; G01F 1/05; G01F 1/22; G01F 1/36; G01F 1/40; G01F 1/42; G01F 1/44; G01P 5/14; G01P 5/16; G01P 5/17
USPC ......... 62/177, 189, 218, 185, 201; 73/861.65, 73/861.52, 202.5, 204.22, 204.26; 137/599.13, 59
See application file for complete search history.

(56) References Cited

U.S. PATENT DOCUMENTS 3,555,251 A   1/1971   Shavit
4,196,849 A   4/1980   Dehart et al.
(Continued)

FOREIGN PATENT DOCUMENTS

CN   2526790   12/2002
CN   101339063   1/2009
(Continued)

OTHER PUBLICATIONS

International Search Report and Written Opinion for Application No. PCT/US2012/029777 dated Oct. 12, 2012 (7 pages).
(Continued)

*Primary Examiner* — Frantz Jules
*Assistant Examiner* — Steve Tanenbaum
(74) *Attorney, Agent, or Firm* — Hamre, Schumann, Mueller & Larson, P.C.

(57) ABSTRACT

A chiller system including an evaporator for evaporating a refrigerant and a water pipe in fluid communication with the evaporator. The water pipe is configured to allow water to pass through at a flow rate and to circulate the water with the evaporator to exchange heat with the refrigerant in the evaporator. The chiller system includes a flow restrictor tube within the water pipe that is configured to allow the water to flow through the flow restrictor tube at a reduced flow rate relative to the flow rate. The chiller system also includes a measuring probe that passes through walls of the water pipe and the flow restrictor tube and includes an accuracy range of flow rates less than the flow rate. The measuring probe is configured to measure the reduced flow rate within the flow restrictor tube where the reduced flow rate is within the accuracy range.

20 Claims, 4 Drawing Sheets

(51) Int. Cl.
*G01F 1/42* (2006.01)
*G01P 5/16* (2006.01)
*G01F 1/36* (2006.01)

(56) References Cited

U.S. PATENT DOCUMENTS

| | | | |
|---|---|---|---|
| 4,449,401 | A | 5/1984 | Kaiser et al. |
| 4,705,066 | A | 11/1987 | Gut et al. |
| 4,916,948 | A | 4/1990 | Inada et al. |
| 4,987,749 | A | 1/1991 | Baier |
| 5,303,584 | A | 4/1994 | Ogasawara et al. |
| 5,329,812 | A | 7/1994 | Tada et al. |
| 5,463,899 | A | 11/1995 | Zemel et al. |
| 5,780,735 | A | 7/1998 | Kadohiro et al. |
| 6,079,264 | A | 6/2000 | Yamakawa et al. |
| 6,293,786 | B1 | 9/2001 | Lasagni et al. |
| 6,557,410 | B2 * | 5/2003 | Uramachi ............. G01F 1/6842 73/202.5 |
| 6,647,775 | B1 | 11/2003 | Hecht et al. |
| 7,121,139 | B2 | 10/2006 | Shajii et al. |
| 7,730,777 | B2 * | 6/2010 | Anzai et al. ................ 73/204.11 |
| 2002/0029629 | A1 | 3/2002 | Uramachi et al. |
| 2004/0129089 | A1 * | 7/2004 | Woodward ............. G01F 1/363 73/861.52 |
| 2006/0101907 | A1 | 5/2006 | Shajii et al. |
| 2009/0007654 | A1 * | 1/2009 | Niikawa .................... G01F 1/00 73/202 |
| 2009/0241577 | A1 * | 10/2009 | Fukushima ............. F25B 13/00 62/259.1 |

FOREIGN PATENT DOCUMENTS

| | | |
|---|---|---|
| CN | 101545700 | 9/2009 |
| DE | 4209121 | 9/1992 |
| EP | 0180974 | 5/1986 |
| JP | 1079561 | 3/1989 |
| JP | 6129746 | 5/1994 |

OTHER PUBLICATIONS

Extended European Search Report for European application No. 12771715.5, dated Aug. 26, 2014 (6 pages).

First Chinese Office Action for Chinese Application No. 201280022198.2, dated Feb. 4, 2015, 13 pgs. (English Translation included).

Second Chinese Office Action for Chinese Application No. 201280022198.2, dated Oct. 23, 2015, 13 pgs (English Translation included, pp. 1-5).

* cited by examiner

WATER FLOW MEASUREMENT DEVICE

BACKGROUND

The present invention relates to fluid flow rate measurement devices, and more particularly to fluid flow rate measurement devices for water pipes in chiller systems.

Fluid flow rate measurement devices typically include a measuring probe that measures fluid flow in a water pipe. The fluid flow rate measurement device is used to measure actual fluid flow in the water pipe.

In chiller systems, a sufficient amount of water flow through the evaporator is important to inhibit the water from freezing in the evaporator. Extraneous factors such as pump malfunction, clogs in the water lines, or partial freezing of the water in the water lines can decrease the water flow rate to a rate insufficient to prevent freezing of the water in the evaporator. To ensure that the chiller does not continue to operate when water flow is insufficient to prevent freezing, the chiller system monitors the water flow rate using the input from the measuring probe and compares the measured flow rate to a water flow trip point. When the measured flow rate is at or below the water flow trip point, the chiller system is shut off in order to prevent water from freezing. A service technician is required to address the low water flow issue prior to restarting the chiller system.

In some cases, due to turbulence or a water flow sensor with high variability, an inaccurate water flow measurement resulting in a water flow measurement above the intended water flow trip point may cause the chiller system to be shut off unnecessarily. This is referred to as a "nuisance trip".

SUMMARY

In one embodiment, the invention provides a chiller system. The chiller system includes an evaporator for evaporating a refrigerant. The chiller system further includes a water pipe in fluid communication with the evaporator. The water pipe is configured to allow water to pass through at a water flow rate and to circulate the water with the evaporator to exchange heat with the refrigerant in the evaporator. The chiller system includes a flow restrictor tube within the water pipe that is configured to allow the water to flow through the flow restrictor tube at a reduced flow rate relative to the water flow rate. In addition, the flow restrictor tube reduces turbulence, which can reduce local flow variability and enhance flow measurement accuracy. The chiller system also includes a measuring probe that passes through walls of the water pipe and walls of the flow restrictor tube and includes an accuracy range of flow rates less than the water flow rate. The measuring probe is configured to measure the reduced flow rate within the flow restrictor tube, wherein the reduced flow rate is within the accuracy range.

In another embodiment the invention provides a method of measuring flow in a chiller system. The method involves evaporating a refrigerant in an evaporator. Passing water through a water pipe at a water flow rate. Circulating the water with the evaporator. Exchanging heat between the water and the refrigerant in the evaporator. Providing a measuring probe including an accuracy range of flow rates that is less than the water flow rate. Passing the water through a flow restrictor tube within the water pipe at a reduced flow rate that is within the accuracy range. Passing the measuring probe though walls of the water pipe and the flow restrictor tube. Measuring the reduced flow rate within the flow restrictor tube with the measuring probe.

In yet another embodiment, the invention provides a fluid flow rate measurement device for measuring a fluid flow through a pipe. The fluid flow rate measurement device includes a pipe configured to allow a fluid to pass through at a fluid flow rate. A flow restrictor tube is positioned within the pipe and is configured to allow the fluid to flow through the flow restrictor tube at a reduced flow rate relative to the fluid flow rate. A measuring probe passes through walls of the pipe and the flow restrictor tube and includes an accuracy range of flow rates less than the fluid flow rate. The measuring probe is configured to measure the reduced flow rate within the flow restrictor tube, wherein the reduced flow rate is within the accuracy range.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
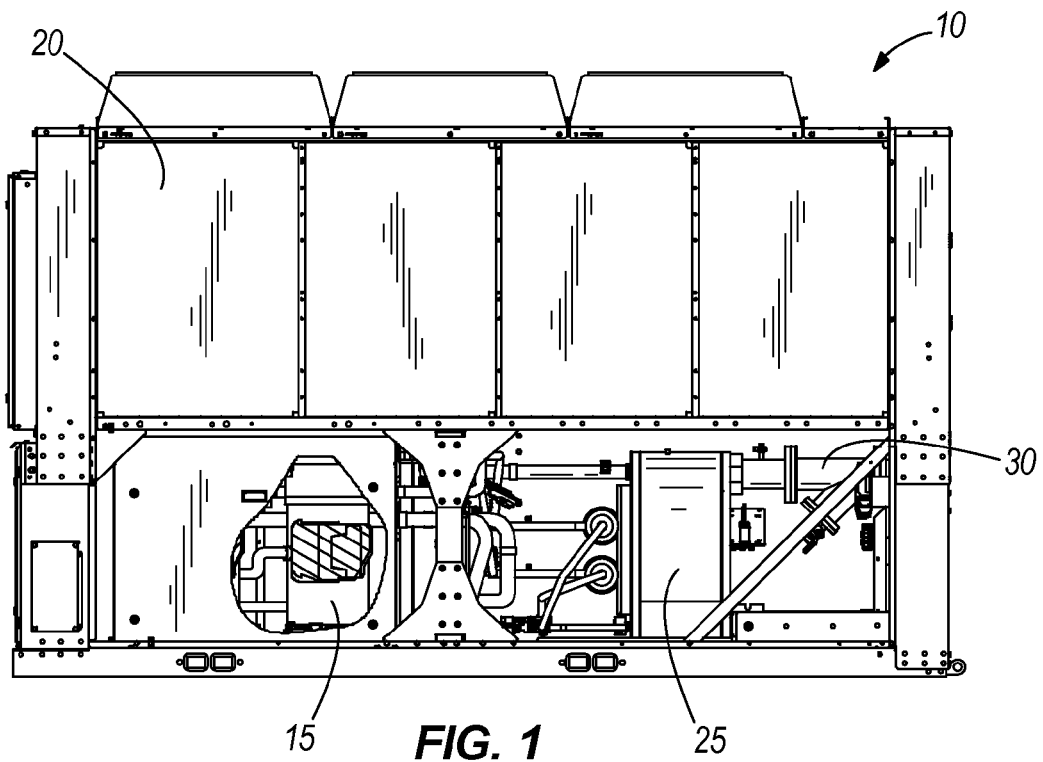
FIG. 1 is a partially sectioned side view of a chiller system.

FIG. 1 illustrates a chiller system 10. The illustrated chiller system 10 includes a compressor 15 that receives refrigerant vapor and discharges compressed vapor to a condenser 20. The condenser 20 receives compressed vapor and discharges condensed refrigerant to a metering device (not shown). The metering device receives condensed refrigerant at a high pressure and discharges refrigerant at a low pressure, and at a lower temperature, to an evaporator 25. The evaporator 25 receives the lower temperature refrigerant, communicates in a heat exchange relationship with water, which flows in a water pipe 30 at a flow rate of about 100 to 200 centimeters per second. After heat exchange between the water and the evaporator 25, the evaporator 25 discharges refrigerant vapor back to the compressor 15.

Figure 2:
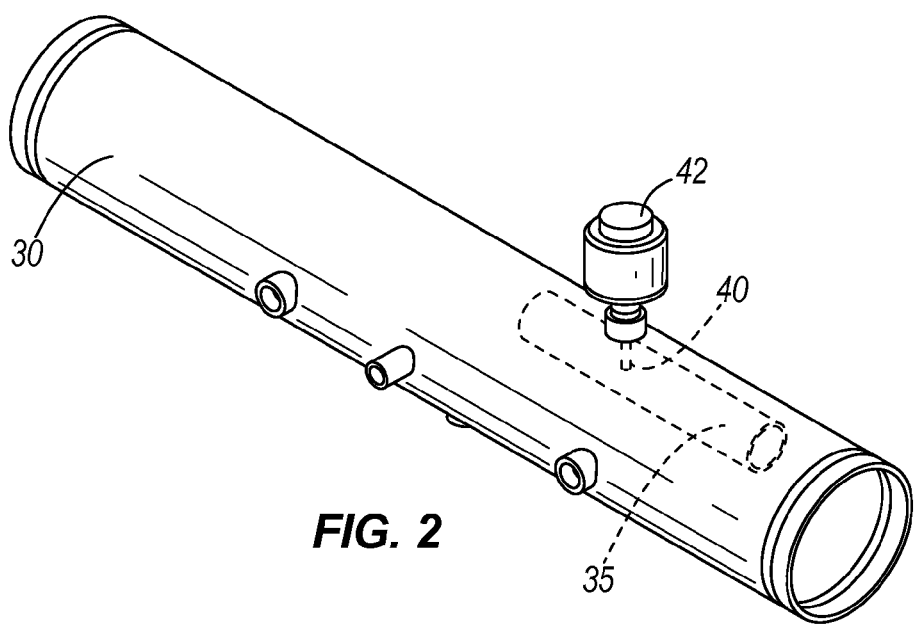
FIG. 2 is a perspective view of a fluid flow measurement device according to one embodiment of the invention.
Figure 3:
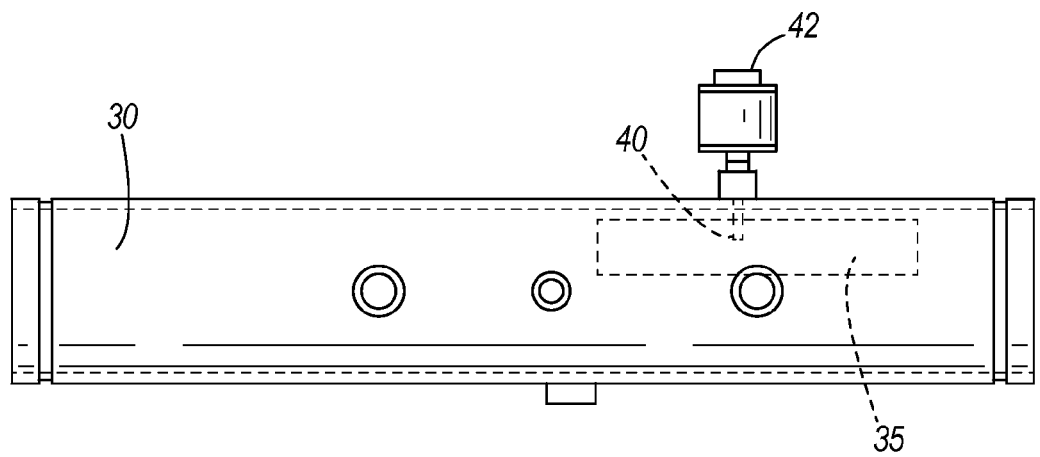
FIG. 3 is a side view of the fluid flow measurement device of FIG. 2.
Figure 4:
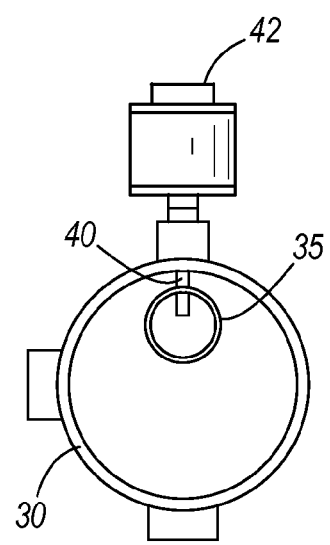
FIG. 4 is an end view of the fluid flow measurement device of FIG. 2.
Figure 5:
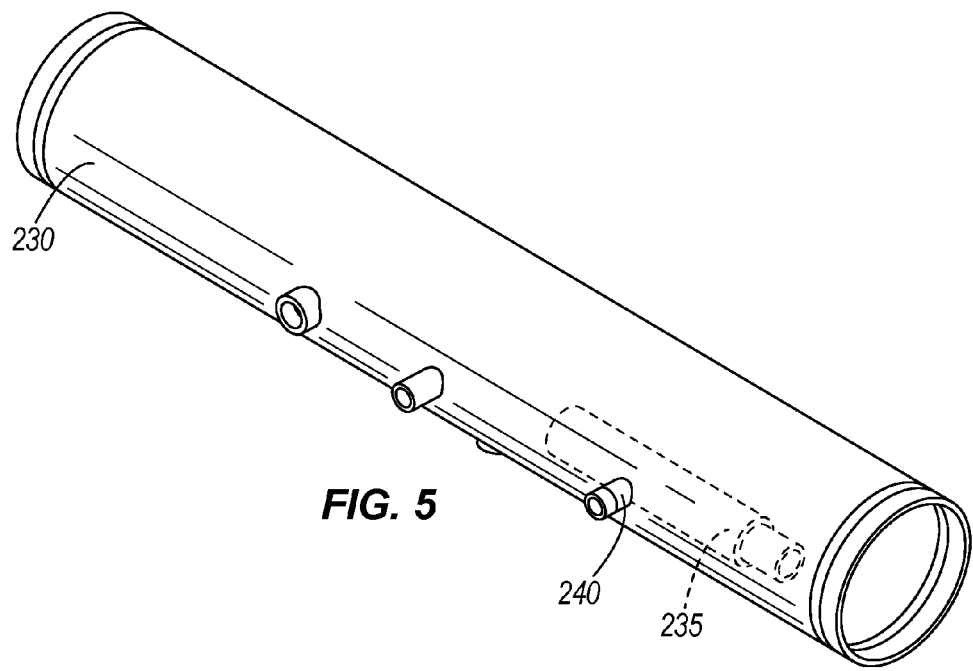
FIG. 5 is a perspective view of a portion of a fluid flow measurement device according to another embodiment of the invention.
Figure 6:
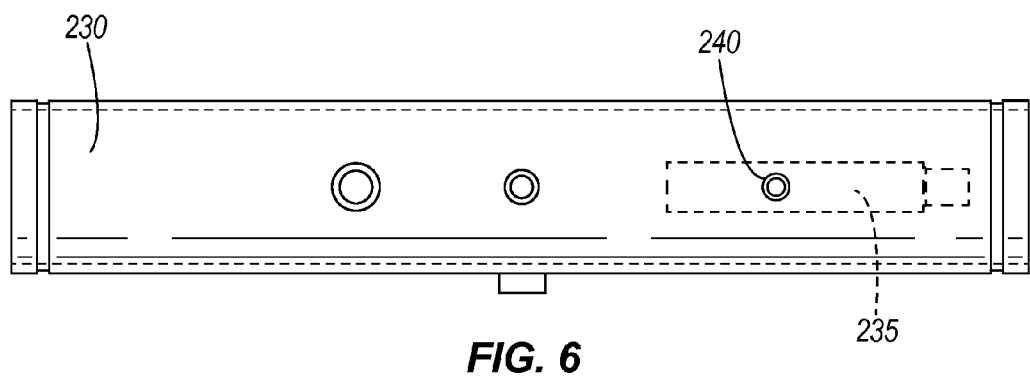
FIG. 6 is a side view of the fluid flow measurement device of FIG. 5.
Figure 7:
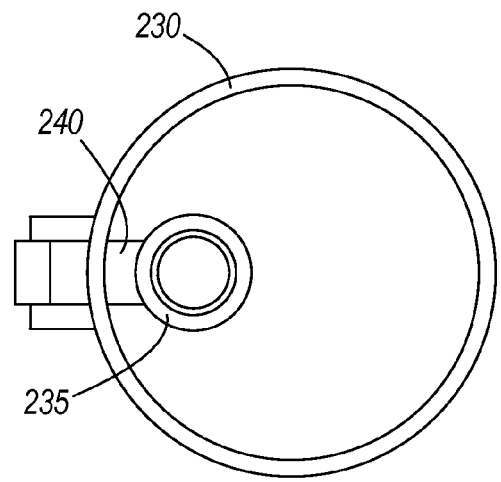
FIG. 7 is an end view of the fluid flow measurement device of FIG. 5.
Figure 8:
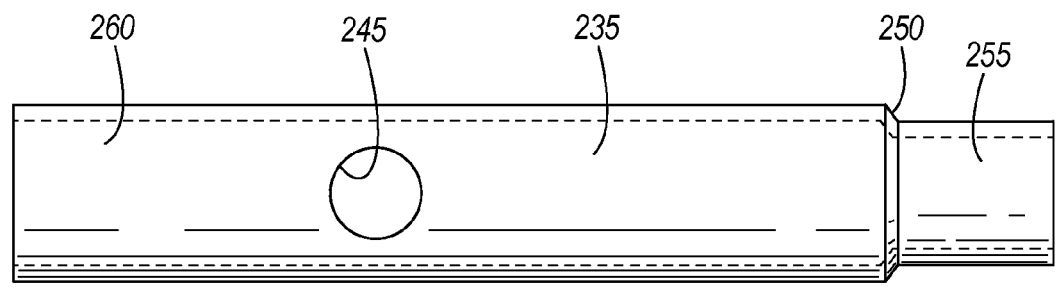
FIG. 8 is an enlarged view of a flow restrictor tube of the fluid flow measurement device of FIG. 5.

The water pipe 30 in the illustrated embodiment is a water pipe that delivers water to the evaporator 25. In other embodiments, the water pipe 30 could also be a water pipe that delivers water away from the evaporator 25 after exchanging heat with the refrigerant in the evaporator 25. In yet other embodiments, the water pipe could be any section of pipe in the water circuit that circulates water with the evaporator 25. In the illustrated embodiment, the water pipe 30 has an inside diameter of 4 inches. In other embodiments, the water pipe 30 can have a diameter of 2 inches, 3 inches, or other dimension up to 10 inches. The water pipe 30 circulates water through the water pipe at a flow rate of between 100 and 200 centimeters per second. In other embodiments, higher flow rates can be used. Referring to FIGS. 2-4, the water pipe 30 includes a flow restrictor tube 35 positioned within the water pipe 30 such that the longitudinal axis of the restrictor tube 35 is parallel to the longitudinal axis of the water pipe 30. The flow restrictor tube 35 is 1 inch schedule 40 water pipe having an outside diameter of 1.315 inches and an inside diameter of 1.049 inches, or approximately 1 inch. In other embodiments, the flow restrictor tube 35 can include other diameter dimensions. As such, for some embodiments, the ratio of the diameter of the inside diameter of the flow restrictor tube 35 to the inside diameter of the water pipe 30 is less than 0.50. In other embodiments, the ratio is less than 0.25. The flow restrictor tube 35 allows water to flow at a reduced flow rate relative to the water flow rate. Preferably, the reduced water flow rate is below 80 centimeters per second and, in some embodiments, between 15 and 60 centimeters per second. In some embodiments of the restrictor tube used with a water pipe having an inside diameter of between 2 and 4 inches, the length of the restrictor tube 35 is between about 5 and 8 inches long.

A measuring probe 40 is connected through the water pipe 30 and to the flow restrictor tube 35 such that a distal end of the measuring probe is exposed to the flow of water through the inside of the restrictor tube 35. In the illustrated embodiment, the measuring probe 40 is a thermal dispersion flow sensor having an accuracy range between 15 and 60 centimeters per second. In other words, the measuring probe is rated to accurately measure flow rates within this range. The measuring probe 40 incorporates a heater and determines a flow rate based on the rate of cooling of the measuring probe 40. A similar type of measuring probe is described in U.S. Pat. No. 4,987,749, the entire contents of which are incorporated herein by reference.

The restrictor tube 35 reduces the flow rate of water passing through the restrictor tube 35 relative to the water flowing through the water pipe 30 in order for the measuring probe 40 to more accurately measure the flow rate and thereby more accurately determine when the chiller system 10 needs to be shut down in the instance of insufficient water flow. By knowing the value of the flow rate of water in the water pipe 30 that corresponds to a water trip point for the prevention of frozen water in the evaporator 25 and the geometry of the water pipe 30 and the restrictor tube 35, a corresponding flow rate value for the water trip point can be calculated for the water flow through the restrictor tube 35. For example, if the water trip point for the water through the water pipe 30 is 100 centimeters per second, then the corresponding water trip point for the restrictor tube 35 is around 40 centimeters per second. The water trip point measured within the restrictor tube 35 is purposefully lower to provide a more accurate measurement as it is well within the accuracy range of the measuring probe 40 as compared to the water trip point of the water pipe 30.

In operation, the compressor 15 receives refrigerant vapor, compresses the vapor, and discharges the compressed vapor to the condenser 20. The condenser 20 receives the vapor and cooling air passing through the condenser 20 absorbs heat causing the vapor to condense. The metering device (not shown) receives condensed refrigerant at a high pressure and discharges the refrigerant at a low pressure, and at a lower temperature, to the evaporator 25. The evaporator 25 receives the lower temperature refrigerant, which absorbs heat from water flowing in the water pipe 30, and then discharges refrigerant vapor to the compressor 15 to repeat the process above.

The flow restricting tube 35 allows water to flow past the measuring probe 40 at the reduced flow rate. The measuring probe 40 measures the reduced flow rate, determines the flow rate of the water, and outputs a signal to an IFM Efector SI flow switch 42 or similar electronic flow sensing switch that includes a water flow trip point. When the measured flow rate is at or below the water flow trip point, the chiller system is shut off in order to prevent water circulated with the evaporator from freezing.

FIGS. 5-8 illustrate a water pipe 230 including a flow restrictor tube 235 according to another embodiment. The flow restrictor tube 235 includes features similar to the flow restrictor tube 35 of FIGS. 1-4, and therefore, like components have been given like reference numbers plus 200 and only the differences between the flow restrictor tubes 35 and 235 will be discussed in detail below.

The flow restrictor tube 235 includes an aperture 245 that receives a measuring probe 240. The flow restrictor tube 235 further includes a tapered portion 250 that is connected to a narrow portion 255. The narrow portion 255 has an inside diameter that is less than the inside diameter of the wide portion 260, which includes a substantially constant inside diameter. The inside diameter of the narrow portion 255 is less than 80% of the inside diameter of the wide portion 260. The tapered portion 250 and the narrow portion 255 may be positioned upstream or downstream of the measuring probe 240. Alternatively, an orifice (not shown) may be used to reduce the water flow rate to the reduced water flow rate. The orifice may be positioned upstream or downstream of the measuring probe 240.

In operation, the water flow in the water pipe 230 is reduced to the reduced water flow rate at least in part by the tapered portion 250 and the narrow portion 255.

Various features and advantages of the invention are set forth in the following claims.

What is claimed is:

1. A chiller system comprising:
an evaporator for evaporating a refrigerant;
a water pipe in fluid communication with the evaporator, the water pipe configured to allow water to pass through at a water flow rate and to circulate the water with the evaporator to exchange heat with the refrigerant in the evaporator;
a flow restrictor tube within the water pipe configured to allow the water to flow through the flow restrictor tube at a reduced flow rate relative to the water flow rate, wherein the flow restrictor tube includes a first portion having a constant inside diameter and a tapered portion tapering in a downstream direction to a second portion having an inside diameter smaller than the constant inside diameter of the first portion, the flow restrictor tube having a longitudinal axis, the first portion having a length in the direction of the longitudinal axis being greater than a length of the tapered portion; and
a measuring probe passing through walls of the water pipe and the walls of the first portion of the flow restrictor tube upstream of the tapered portion and including an accuracy range of flow rates less than the water flow rate, the measuring probe configured to measure the reduced flow rate within the flow restrictor tube, wherein the reduced flow rate is within the accuracy range.

2. The chiller system of claim 1, wherein the measuring probe is a thermal dispersion flow sensor.

3. The chiller system of claim 1, wherein the ratio of any of the diameters of the flow restrictor tube to a diameter of the water pipe is less than 0.50.

4. The chiller system of claim 3, wherein the ratio of any of the diameters of the flow restrictor tube to the diameter of the water pipe is less than 0.25.

5. The chiller system of claim 1, wherein the water flow rate is over 100 centimeters per second and the reduced flow rate is less than 80 centimeters per second.

6. The chiller system of claim 1, wherein the accuracy range is below 80 centimeters per second.

7. The chiller system of claim 1, wherein the accuracy range is between 15 and 60 centimeters per second.

8. A method of measuring flow in a chiller system, the method comprising:
    evaporating a refrigerant in an evaporator;
    passing water through a water pipe at a water flow rate;
    circulating the water with the evaporator;
    exchanging heat between the water and the refrigerant in the evaporator;
    providing a measuring probe including an accuracy range of flow rates less than the water flow rate;
    passing the water through a flow restrictor tube within the water pipe at a reduced flow rate within the accuracy range, wherein the flow restrictor tube includes a first portion having a constant inside diameter and a tapered portion tapering in a downstream direction to a second portion having an inside diameter smaller than the constant inside diameter of the first portion, the flow restrictor tube having a longitudinal axis, the first portion having a length in the direction of the longitudinal axis being greater than a length of the tapered portion;
    passing the measuring probe through walls of the water pipe and the walls of the first portion of the flow restrictor tube upstream of the tapered portion; and
    measuring the reduced flow rate within the flow restrictor tube with the measuring probe.

9. The method of claim 8, wherein providing a measuring probe including an accuracy range of flow rates less than the water flow rate includes providing a thermal
    dispersion flow sensor with an accuracy range of between 15 to 60 centimeters per second.

10. The method of claim 9, wherein passing water through a water pipe at a water flow rate includes passing water through the water pipe at a water flow rate of at least 100 centimeters per second.

11. The method of claim 10, further comprising reducing the water flow rate within the restrictor tube to the reduced flow rate of less than 80 centimeters per second.

12. A fluid flow rate measurement device for a fluid flow through a pipe, the fluid flow rate measurement device comprising:
    a pipe configured to allow a fluid to pass through at a fluid flow rate;
    a flow restrictor tube within the pipe configured to allow the fluid to flow through the flow restrictor tube at a reduced flow rate relative to the fluid flow rate, wherein the flow restrictor tube includes a first portion having a constant inside diameter and a tapered portion tapering in a downstream direction to a second portion having an inside diameter smaller than the constant inside diameter of the first portion, the flow restrictor tube having a longitudinal axis, at least one of the first portion and the second portion having a length in the direction of the longitudinal axis being greater than a length of the tapered portion; and
    a measuring probe passing through walls of the pipe and walls of the first portion of the flow restrictor tube upstream of the tapered portion and including an accuracy range of flow rates less than the fluid flow rate, the measuring probe configured to measure the reduced flow rate within the flow restrictor tube, wherein the reduced flow rate is within the accuracy range.

13. The fluid flow rate measurement device of claim 12, wherein the measuring probe is a thermal dispersion flow sensor.

14. The fluid flow rate measurement device of claim 12, wherein the ratio of any of the diameters of the flow restrictor tube to a diameter of the pipe is less than 0.50.

15. The fluid flow rate measurement device of claim 14, wherein the ratio of any of the diameters of the flow restrictor tube to the diameter of the pipe is less than 0.25.

16. The fluid flow rate measurement device of claim 12, wherein the accuracy range is between 15 and 60 centimeters per second.

17. The chiller system of claim 1, wherein the flow restrictor tube has a longitudinal axis, the first portion and the second portion each having a length in the direction of the longitudinal axis being greater than a length of the tapered portion.

18. The chiller system of claim 1, wherein the flow restrictor tube has a longitudinal axis, the first portion having a length in the direction of the longitudinal axis being greater than a length of the tapered portion.

19. The chiller system of claim 1, wherein the flow restrictor tube has a longitudinal axis, the first portion having a length in the direction of the longitudinal axis being greater than a length of the second portion.

20. The fluid flow rate measurement device of claim 12, wherein the flow restrictor tube has a longitudinal axis, at least one of: the first portion having a length in the direction of the longitudinal axis being greater than a length of the tapered portion, the second portion having a length in the direction of the longitudinal axis being greater than a length of the tapered portion, and the first portion having a length in the direction of the longitudinal axis being greater than a length of the second portion.

* * * * *